United States Patent
Cordeiro

(10) Patent No.: US 10,135,515 B2
(45) Date of Patent: Nov. 20, 2018

(54) ANTENNA BEAM TRAINING AND TRACKING PROTOCOL FOR 60 GHZ OPERATION

(71) Applicant: Intel Corporation, Santa Clara, CA (US)

(72) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/863,000

(22) Filed: Sep. 23, 2015

(65) Prior Publication Data

US 2016/0013854 A1    Jan. 14, 2016

Related U.S. Application Data

(63) Continuation of application No. 14/693,048, filed on Apr. 22, 2015, which is a continuation of application No. 12/229,667, filed on Aug. 26, 2008, now Pat. No. 9,048,945.

(60) Provisional application No. 60/969,505, filed on Aug. 31, 2007.

(51) Int. Cl.
| H04B 1/00 | (2006.01) |
| H04B 7/06 | (2006.01) |
| H04B 7/0413 | (2017.01) |
| H04B 7/08 | (2006.01) |
| H04B 17/21 | (2015.01) |
| H04W 8/24 | (2009.01) |

(52) U.S. Cl.
CPC ........ *H04B 7/0684* (2013.01); *H04B 7/0413* (2013.01); *H04B 7/063* (2013.01); *H04B 7/0613* (2013.01); *H04B 7/0837* (2013.01); *H04B 7/0851* (2013.01); *H04B 17/21* (2015.01); *H04W 8/24* (2013.01)

(58) Field of Classification Search
CPC ..................................................... H04B 7/0851
See application file for complete search history.

(56) References Cited

U.S. PATENT DOCUMENTS

| 5,138,327 | A   | * | 8/1992  | Chang ............... H04B 7/088 342/367 |
| 6,198,929 | B1  |   | 3/2001  | Krishnamurthi et al. |
| 6,320,919 | B1  | * | 11/2001 | Khayrallah ........ H04B 7/0845 375/341 |
| 6,721,299 | B1  | * | 4/2004  | Song ................... H04B 1/707 370/342 |
| 9,048,945 | B2  |   | 6/2015  | Cordeiro |
| 2002/0168945 | A1 |   | 11/2002 | Hwang et al. |
| 2003/0124995 | A1 |   | 7/2003  | Tanaka |
| 2005/0159108 | A1 |   | 7/2005  | Fletcher et al. |

(Continued)

OTHER PUBLICATIONS

"U.S. Appl. No. 14/693,048, Non Final Office Action dated Jan. 14, 2016", 13 pgs.

(Continued)

*Primary Examiner* — Hsin-Chun Liao
(74) *Attorney, Agent, or Firm* — Schwegman Lundberg & Woessner, P.A.

(57) ABSTRACT

A particular communications protocol is used for antenna training to accomplish directional communications in a wireless communications network. In some embodiments, pertinent information for various requests, responses, and status reports, is included in information elements.

15 Claims, 6 Drawing Sheets

| Bits 8 | 8 | 4 | 4 | 6 | 6 | 6 | 1 | 1 | 4 | 1 | 1 | 2 | 1 |
|---|---|---|---|---|---|---|---|---|---|---|---|---|---|
| Element ID | Length | TX antenna type | RX antenna type | Number of training sequences | Length of training sequences | Training block size | Continuation | Training desired | Number of Iterations | Feedback needed | Cycle rotation | Status | reserved |

ATIE

(56) References Cited

U.S. PATENT DOCUMENTS

| | | | |
|---|---|---|---|
| 2005/0195734 A1 | 9/2005 | Sandell et al. | |
| 2006/0056316 A1 | 3/2006 | Chandra et al. | |
| 2006/0098568 A1 | 5/2006 | Oh et al. | |
| 2006/0146731 A1* | 7/2006 | Lewis | H04W 48/16 370/254 |
| 2006/0165191 A1* | 7/2006 | Lin | H04B 7/0417 375/267 |
| 2006/0270434 A1* | 11/2006 | Iacono | H04B 7/0604 455/522 |
| 2007/0253501 A1* | 11/2007 | Yamaura | H04B 7/0417 375/262 |
| 2008/0014892 A1* | 1/2008 | Aldana | H04B 7/0691 455/277.1 |
| 2016/0050008 A1 | 2/2016 | Cordeiro | |

OTHER PUBLICATIONS

"U.S. Appl. No. 14/693,048, Response fled Apr. 12, 2016 to Non Final Office Action dated Jan. 14, 2016", 9 pgs.

"U.S. Appl. No. 12/229,667, Advisory Action dated Apr. 8, 2014", 3 pgs.

"U.S. Appl. No. 12/229,667, Advisory Action dated May 7, 2013", 3 pgs.

"U.S. Appl. No. 12/229,667, Advisory Action dated Jun. 6, 2013", 3 pgs.

"U.S. Appl. No. 12/229,667, Final Office Action dated Jan. 27, 2014", 9 pgs.

"U.S. Appl. No. 12/229,667, Final Office Action dated Feb. 12, 2013", 9 pgs.

"U.S. Appl. No. 12/229,667, Final Office Action dated Aug. 22, 2011", 8 pgs.

"U.S. Appl. No. 12/229,667, Non Final Office Action dated Mar. 3, 2011", 8 pgs.

"U.S. Appl. No. 12/229,667, Non Final Office Action dated Aug. 13, 2013", 8 pgs.

"U.S. Appl. No. 12/229,667, Non Final Office Action dated Aug. 26, 2014", 8 pgs.

"U.S. Appl. No. 12/229,667, Non Final Office Action dated Sep. 25, 2012", 8 pgs.

"U.S. Appl. No. 12/229,667, Notice of Allowance dated Jan. 22, 2015", 8 pgs.

"U.S. Appl. No. 12/229,667, Notice of Allowance dated Feb. 13, 2015", 9 pgs.

"U.S. Appl. No. 12/229,667, Response filed Mar. 27, 2014 to Final Office Action dated Jan. 27, 2014", 15 pgs.

"U.S. Appl. No. 12/229,667, Response filed Apr. 12, 2013 to Final Office Action dated Feb. 12, 2013", 13 pgs.

"U.S. Appl. No. 12/229,667, Response filed Apr. 28, 2014 to Advisory Action dated Apr. 8, 2014", 14 pgs.

"U.S. Appl. No. 12/229,667, Response filed May 16, 2013 to Advisory Action dated May 7, 2013", 3 pgs.

"U.S. Appl. No. 12/229,667, Response filed May 20, 2011 to Non Final Office Action dated Mar. 3, 2011", 11 pgs.

"U.S. Appl. No. 12/229,667, Response filed Jul. 12, 2013 to Advisory Action dated Jun. 6, 2013", 13 pgs.

"U.S. Appl. No. 12/229,667, Response filed Oct. 13, 2011 to Final Office Action dated Aug. 22, 2011", 12 pgs.

"U.S. Appl. No. 12/229,667, Response filed Nov. 8, 2013 to Non Final Office Action dated Aug. 13, 2013", 15 pgs.

"U.S. Appl. No. 12/229,667, Response filed Nov. 25, 2014 to Non Final Office Action dated Aug. 26, 2014", 13 pgs.

"U.S. Appl. No. 12/229,667, Response filed Dec. 3, 2012 to Non Final Office Action dated Sep. 25, 2012", 14 pgs.

"U.S. Appl. No. 14/693,048, Advisory Action dated Nov. 3, 2016", 3 pgs.

"U.S. Appl. No. 14/693,048, Final Ofice Action dated Jun. 17, 2016", 15 pgs.

"U.S. Appl. No. 14/693,048, Non Final Office Action dated Feb. 3, 2017", 13 pgs.

"U.S. Appl. No. 14/693,048, Preliminary Amendment filed Sep. 22, 2015", 6 pgs.

"U.S. Appl. No. 14/693,048, Response filed Oct. 17, 2016 to Final Office Action dated Jun. 17, 2016", 8 pgs.

"U.S. Appl. No. 14/693,048, Response filed Dec. 19, 2016 to Advisory Action dated Nov. 3, 2016", 8 pgs.

"U.S. Appl. No. 14/693,048, Final Office Action dated Jul. 7, 2017", 14 pgs.

"U.S. Appl. No. 14/693,048, Response filed May 2, 2017 to Non Final Office Action dated Feb. 3, 2017", 8 pgs.

"U.S. Appl. No. 14/693,048, Advisory Action dated Nov. 24, 2017", 3 pgs.

"U.S. Appl. No. 14/693,048, Response filed Jan. 5, 2018 to Final Office Action dated Jul. 7, 2017", 15 pgs.

"U.S. Appl. No. 14/693,048, Response filed Nov. 7, 2017 to Final Office Action dated Jul. 7, 2017", 15 pgs.

"U.S. Appl. No. 14/693,048, Non Final Office Action dated Feb. 22, 2018", 14 pgs.

* cited by examiner

FIG. 3A

ACIE

| Bits 8 | 8 | 4 | 6 | 4 | 6 | 4 |
|---|---|---|---|---|---|---|
| Element ID | Length | TX antenna type | Number of TX antenna elements | RX antenna type | Number of RX antenna elements | reserved |

FIG. 3B

ATIE

| Bits 8 | 8 | 4 | 4 | 6 | 6 | 6 | 1 | 1 | 4 | 1 | 1 | 2 | 1 |
|---|---|---|---|---|---|---|---|---|---|---|---|---|---|
| Element ID | Length | TX antenna type | RX antenna type | Number of training sequences | Length of training sequences | Training block size | Continuation | Training desired | Number of Iterations | Feedback needed | Cycle rotation | Status | reserved |

FIG. 3C

AFIE

| Bits 8 | 8 | 2 | 4 | 6 | 288 | 46 |
|---|---|---|---|---|---|---|
| Element ID | Length | Status | Type of Feedback | Selected beam index | Quantized Transmitter Weights | reserved |

ANTENNA BEAM TRAINING AND TRACKING PROTOCOL FOR 60 GHZ OPERATION

CROSS-REFERENCE TO RELATED APPLICATIONS

This patent application is a continuation of U.S. patent application Ser. No. 14/693,048, filed Apr. 22, 2015, which is a continuation of U.S. patent application Ser. No. 12/229,667 entitled "Antenna Training and Tracking Protocol," filed on Aug. 26, 2008, which claims priority to U.S. Provisional Application No. 60/969,505, filed Aug. 31, 2007, all of which are hereby incorporated by reference in their entirety.

BACKGROUND

Some types of wireless networks, in particular those that operate in the 60 GHz bands, use directional communications to mitigate intra-network and inter-network interference between devices. The directionality of the transmissions and receptions are typically achieved through the use of multi-antenna phased arrays. To achieve directionality in a particular direction, such arrays are 'trained' by transmitting a known pattern, and processing the resultant signals received at each antenna of the receiving device to determine the parameters to use to achieve directionality in that particular direction. If the devices are mobile, new antenna training may be frequently required to adjust the desired directionality by determining new parameters. Although coarse antenna training procedures are available, to achieve high data rates fine antenna training must be done, and currently defined protocols do not provide an efficient process for doing this.

BRIEF DESCRIPTION OF THE DRAWINGS

Some embodiments of the invention may be understood by referring to the following description and accompanying drawings that are used to illustrate embodiments of the invention. In the drawings:

FIGS. 3A, 3B, and 3C show information elements for antenna training, according to an embodiment of the invention.

DETAILED DESCRIPTION

Figure 1A:
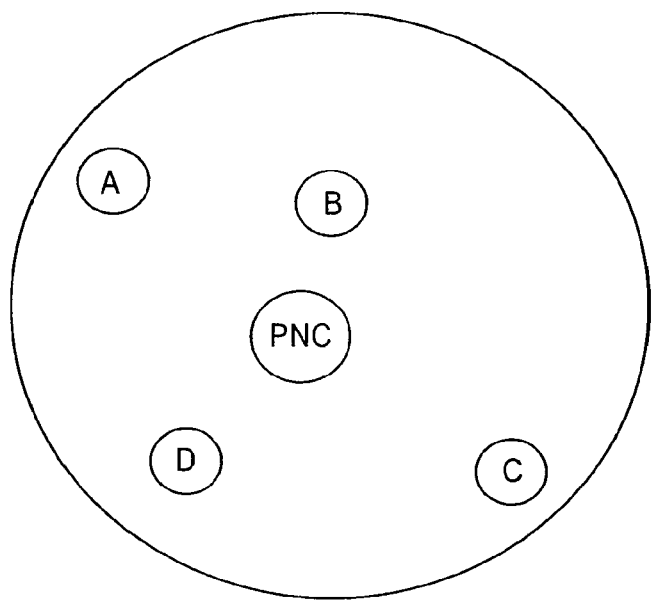
FIGS. 1A and 1B show a wireless network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by one or more computers). For example, a computer-readable medium may include a tangible storage medium, such as but not limited to read only memory (ROM); random access memory (RAM); magnetic disk storage media; optical storage media; a flash memory device, etc. A computer-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term "mobile" wireless device is used to describe a wireless device that may be in motion while it is communicating.

Various embodiments of the invention use a particular communications protocol to request, perform, and acknowledge antenna training and tracking for directional wireless communications. As the terms are used here, 'antenna training' pertains to establishing new parameters to achieve directionality before new directional communications begin, while 'antenna tracking', pertains to adjusting the established parameters during ongoing directional communications to maintain proper directionality.

Figure 1B:
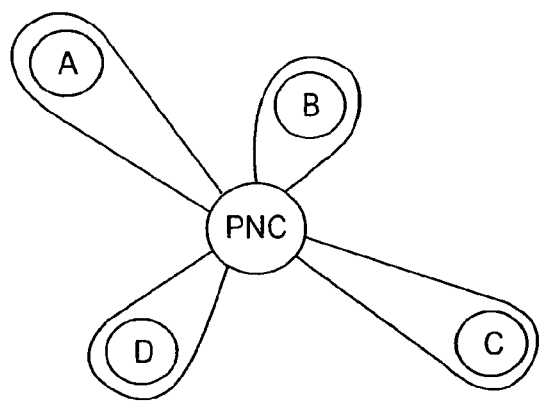

FIGS. 1A and 1B show a wireless network, according to an embodiment of the invention. For convenience, a piconet controller PNC is shown as the network controller, while wireless devices (DEV) labeled A, B, C, and D are shown as being part of the network. However, other types of wireless networks and network devices may also be used. For example, the network controller may be an access point (AP), base station (BS), or any other type of wireless network controller. The other wireless devices may be mobile stations (MS), subscriber stations (SS), STA's, or any other type of mobile wireless network devices. In FIG. 1A, the PNC is shown transmitting signals to the network devices in a substantially omnidirectional manner (the radiation pattern is represented by the large circle). In FIG. 1B, the PNC is shown transmitting signals to the network devices in a directional manner (the radiation patterns are represented by the teardrop shapes, although actual radiation pattern may exhibit other features such as sidelobes and backlobes). In a similar manner, each of the mobile devices may transmit to the PNC in an omnidirectional manner, or in a directional manner with the direction of the transmission beam being toward the PNC. The radiation patterns from the mobile devices are not shown to avoid making FIG. 1B look overly cluttered, but may also be shown with a circular shape (omnidirectional) or a teardrop shape (directional). Each of the controllers and other wireless devices may comprise various components, such as but not limited to an antenna, a radio, a processor, a memory, software, and in some cases a battery to provide operational power.

Figure 2A:
FIGS. 2A, 2B, and 2C show overall frame formats, according to an embodiment of the invention.
Figure 2B:
Figure 2C:
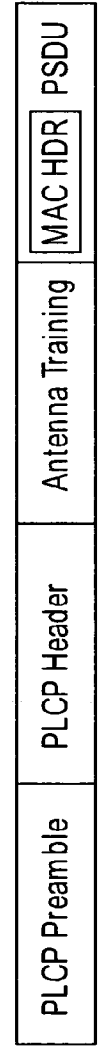

FIGS. 2A, 2B, and 2C show overall frame formats, according to an embodiment of the invention. All begin with a preamble to permit receiving devices to synchronize on the signal, and a header to describe how to interpret the remaining parts of the frame. The preamble and the header are shown as physical layer convergence protocol (PLCP), but other protocol conventions may also be used. FIG. 2A shows a common format, with the header being followed by at least one protocol service data unit (PSDU) containing data to be exchanged between the two communicating devices. However, there is no provision for antenna training in this format. FIG. 2B shows a frame devoted primarily to antenna training, with the header being followed by an antenna training section containing multiple training sequences. FIG. 2C shows a combination of both, with a section containing training sequences, and also at least one PSDU to exchange information. In some embodiments, the PLCP Header may contain one or more fields to indicate the presence or absence of the Antenna Training section and the PSDU(s). Each PSDU may also contain at least one medium access control (MAC) header, containing more information about the contents of a portion of the PSDU. In some embodiments, MAC headers may be used to exchange information about antenna training (but not the actual antenna training sequences), although other embodiments may differ in this respect.

In a typical sequence of events, a device may request antenna training with another device with which it has established communications. Prior to such a request, the devices may be communicating with each other through omnidirectional communications, or through coarse directional communications. The antenna training may permit fine directional (narrow beam) communications, which may in turn permit higher data rates with less interference with neighboring devices. The format of FIG. 2A may be used to request this training, by placing the request into the data format at an appropriate place, such as in the MAC header. A response from the other device may also use the format of FIG. 2A, accepting or rejecting the request. Any necessary exchange of information, such as the antenna capabilities of the two devices, may also use this format.

The format of FIG. 2B may be used for the actual antenna training. (The format of FIG. 2C may also be used for this, if there is other information to exchange and the PSDU is the appropriate place to exchange it.) Within the Antenna Training section, known training sequences may be repetitively transmitted from the first device to the second device, using different antennas, combinations of antennas, and/or antenna parameters at both the first and second devices. The receiving device may determine which portion of the training sequences were received with the highest quality, and provide this information back to the device that transmitted the training sequences. By performing this exchange of training sequences in both directions, the best combination of antenna(s) and/or parameters may be determined, for use in subsequent directional communications.

The format of FIG. 2C may be used for antenna tracking. Although fine antenna training may have already been performed, wireless communications are subject to changing conditions that may affect the quality of the communications. For example, one of the wireless devices may be relocated, or an object may be moved between the two devices, causing an obstruction to, or reflections of, the signals. While the two devices are communicating using the results of the previous antenna training, they may also monitor the quality of those existing communications by repeating the training sequences. These new results may then be used to adjust the antenna selection and/or antenna parameters, so that suitable quality in the communications may be maintained.

Information regarding the antenna training may be exchanged through the use of new information elements (IE) that have been created for this purpose. Information elements, in general, are a particular data protocol that has been previously created to allow specialized information to be exchanged within an overall frame format, without having to redefine the frame formats for each new type of information. Although the general format of IE's is known, the particular IE's described here have been created to exchange antenna training information.

FIGS. 3A, 3B, and 3C show information elements for antenna training, according to an embodiment of the invention. Each of these three IE's begins with the standard IE format of an 8-bit Element ID field to identify which type of IE it is, followed by an 8-bit Length field to specify the length of this IE. For the remaining fields, the example IE's are each shown with a particular number of particular fields of particular lengths, and arranged in a particular order. However, other embodiments may differ in the types of fields, the number of fields, the bit length of each field, and/or the order of the fields, provided the key information is still present.

FIG. 3A shows an antenna capability information element (ACIE), according to an embodiment of the invention. The ACIE contains information about the antennas of the device transmitting the ACIE. This type of IE may be exchanged between two devices during discovery and/or during association, and may be included in any suitable frame of those operations. Following the standard Element ID and Length fields, a TX Antenna Type field may be used to indicate the type of antenna system the device has for transmission. For example, this field may indicate a non-trainable antenna (NTA), a switched beam antenna (SBA), or a phased array antenna (PAA). An NTA cannot be trained to transmit only in a particular direction, so indicating an NTA in this field may mean that the antenna training activities can be skipped. In some embodiments, an NTA may provide omnidirectional transmission only, while in other embodiments a directional antenna with a fixed direction may be used.

An SBA can be made to transmit or receive directionally in any of several directions, but these directions are pre-defined and limited in number. Although in some embodiments the pre-defined directions may collectively encompass the whole 360-degree arc (for example, 8 directions each covering a 45-degree arc), fine adjustments between these directions are not possible with an SBA, and communications quality may vary within a single directional arc. In some embodiments, an SBA will have multiple antenna elements, each of which is physically configured to be directional in a different, fixed, direction.

A PAA has continuously-adjustable directionality. A PAA may contain multiple, mostly omnidirectional, antenna elements arranged in a particular physical pattern, with means to provide a separate signal to each element for transmission, or to receive a separate signal from each element for reception. The transmissions from each of these multiple antenna elements may combine in such a way as to produce an overall transmission that is strong in one direction, and weak in the other directions. For receiving, the receptions from each of these multiple antennas may be collectively processed in such as way as to separate out the signals from a particular direction, while ignoring the signals from other directions. The particular parameters used to provide the transmission signals or to process the received signals may determine the direction and narrowness of these directional communications.

The field for Number of TX Antenna Elements may indicate how many such antenna elements are available to be used for transmission. This information may be used, for example, to determine how many times a training sequence is to be repeated, so that the performance of every antenna element can be monitored. The fields for RX Antenna Type and Number of RX Antenna Elements are similar to the equivalent fields for transmission, except these parameters are only applied to the antennas for reception. In many applications, the type of antenna and the number of antenna elements will be the same for transmit and receive (because the same antenna system is used for both), but this format allows for differences between these two. For example, if eight antenna elements are to be used for transmission, while only four of those antenna elements are to be used for reception, this format can accurately convey that information. A Reserved field is also shown, which is currently unassigned but may be made available for future enhancements.

FIG. 3B shows an antenna training information element (ATIE), according to an embodiment of the invention. As described before for FIG. 3A, the TX Antenna Type and RX Antenna Type fields may be used to specify whether these antennas are NTA, SBA, or PAA, respectively. The next three fields in FIG. 3B may be used to indicate the number of training sequences to be used in the antenna training, the length of each of these training sequences, and the size of the training blocks to be used in the antenna training. Since multiple training sequences may be transmitted sequentially, this information may help the receiving device separate the incoming data stream into the correct training sequences. Sequences and blocks are described later in more detail.

Sometimes the training process may be continued over multiple frames. The Continuation field indicates whether the training parameters described in this IE are to be applied to initiating a new training process, or if they are a continuation of an ongoing training process that was previously initiated. The Training Desired field indicates whether the device transmitting this IE even wishes to engage in a training process. If not, some of the other fields in this IE, such as the training block size, and the number and length of training sequences, may be ignored. The Number of Iterations field indicates how many iterations between the transmitter and receiver will occur during the antenna training process. Performing the antenna training over a sequence of iterations may decrease the amount of time needed for the whole antenna training process.

The Feedback Needed field indicates whether feedback is required from the device receiving this IE. If required, this feedback may be provided in the AFIE described later. The Cycle Rotation field may indicate the order in which the training sequences are provided during the actual training. This is also described later. The Status field may indicate 1) a request for training, 2) acceptance or rejection of such a request from another device, or 3) such training is not supported by this device. The Reserve field is currently unassigned.

FIG. 3C shows an antenna feedback information element (AFIE), according to an embodiment of the invention. This IE may be included in a response to an ATIE that indicated Feedback was needed. The Status field may indicate a beam selection status for the transmitter of the device that this device is providing feedback to, such as: 1) a transmit beam is being selected, 2) the same transmit beam(s) as before should continue to be used, or 3) different transmit beam(s) than before should be used. The Type of Feedback field may be used to indicate what type of feedback this IE is providing. The Selected Beam Index field may be used when the other device's antenna type is an SBA, to indicate which transmit beam is being selected. This field may be used only if the Status field indicated a transmit beam is being selected. The Quantized Transmitter Weights field may be used when the other device's antenna type is a PAA, to indicate the parameters to be used in the calculations. As before, a currently-unassigned Reserved field may also be included in the IE.

Figure 4:
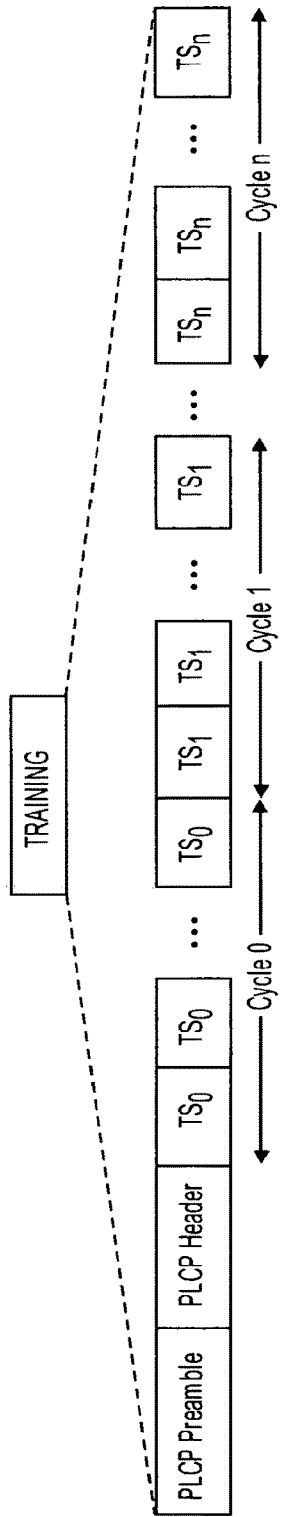
FIGS. 4 and 5 show a portion of a training session, according to embodiments of the invention.
Figure 5:
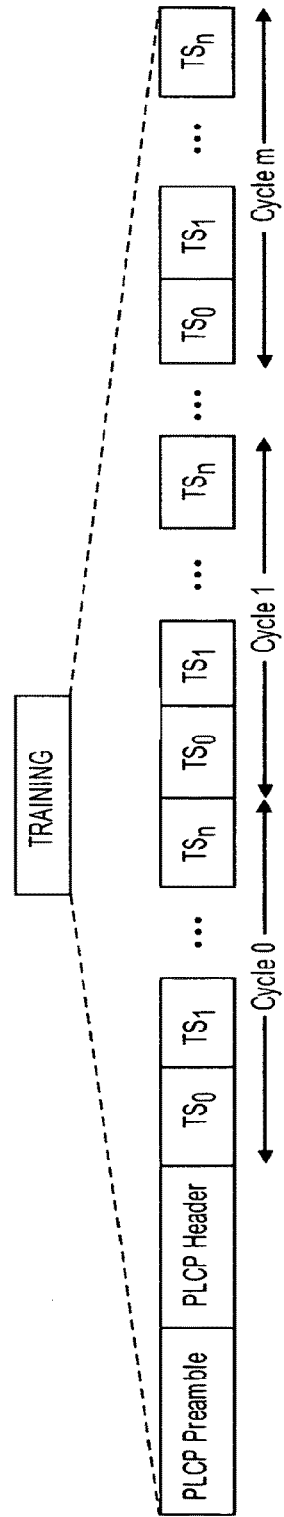

FIGS. 4 and 5 show a portion of a training session, according to embodiments of the invention. Following a preamble and header, the transmitting device may transmit a series of training sequences (TS), with each training sequence containing a known data pattern, which the receiving device may process in particular ways to obtain parameters for antenna directivity. Each transmitter antenna may transmit a separate TS to each receiver antenna. For example, if the transmitter has N antennas, and the receiver has M antennas, a total of N×M training sequences may be transmitted to cover every transmitter/receiver antenna combination. The order in which the training sequences rotate through the antennas may be specified by the Cycle Rotation field of the ATIE of FIG. 3B. The two orders are shown in FIGS. 4 and 5, in which $TS_0$ represents a training sequence transmitted from transmitter antenna 0, $TS_1$ represents the training sequence transmitted from transmitter antenna 1, etc. In FIG. 4, the same transmitter antenna transmits the TS to each of the receiver antennas in turn, before repeating this process from the next transmitter antenna. In FIG. 5, the opposite rotation pattern is used, with each transmitter antenna in turn transmitting a TS to the same receiver antenna, before repeating the process for the next receiver antenna. A 'cycle' represents a single antenna on one device communicating TS's with all the antennas of the other device, and would contain M TS's in FIG. 4, or N TS's in FIG. 5.

The examples of FIGS. 4 and 5 show training sequences being transmitted in one direction, from a particular device to another particular device. However, antenna training may require transmitting training sequences in both directions, from each device to the other device, so that subsequent directional communication may take place in both directions.

Figure 6:
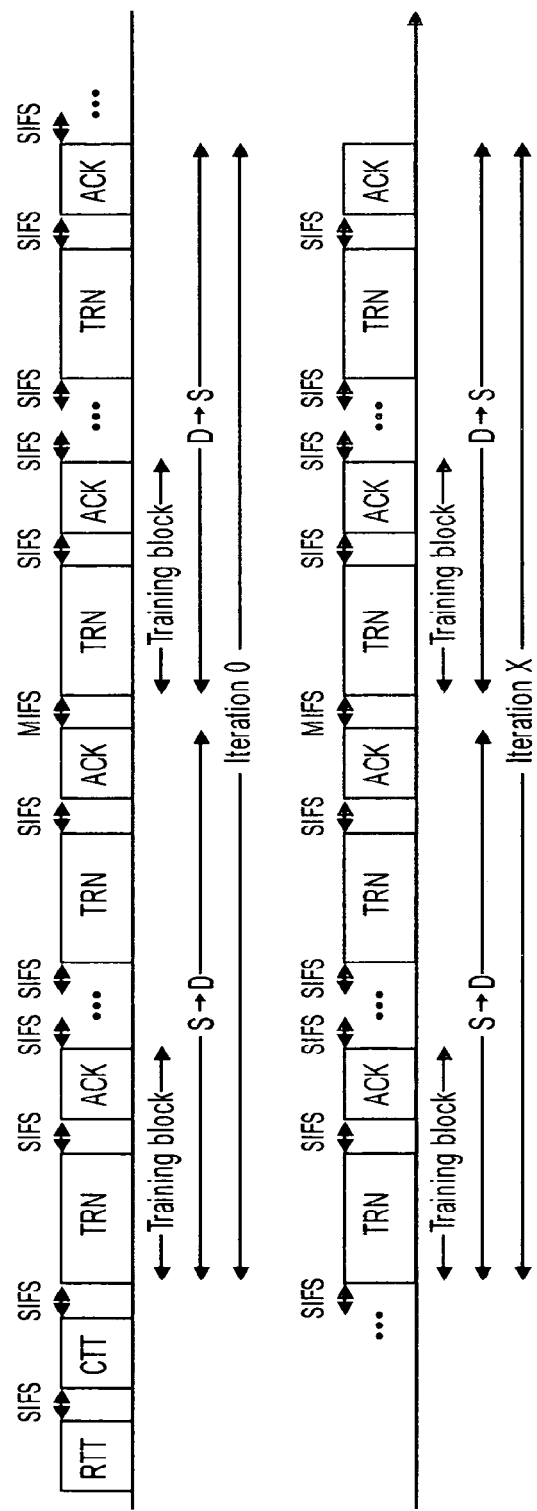
FIG. 6 shows bi-directional antenna training, according to an embodiment of the invention.

FIG. 6 shows bi-directional antenna training, according to an embodiment of the invention. Such training may take place in either an explicit mode, in which the training may be handled as a stand-alone event, or in an implicit mode, in which the training is embedded into other communications. In the explicit mode, two control frames, labeled here as Request To Train (RTT) and Clear To Train (CTT), may be used to initiate a training session. When two wireless network devices are already associated with each other (e.g., a PNC and a DEV, though other embodiments may use other combinations), either device may request a training session by transmitting an RTT to the other. The receiving device may respond by transmitting back a CTT. Both the RTT and the CTT may contain an ATIE to set up the specifics of the training session. For the purposes of this description, the device requesting the training, e.g., the device transmitting the RTT, is considered a 'source' device S, and the device responding to the request, e.g., the device transmitting the CTT, is considered a 'destination' device D. The label S→D in FIG. 6 indicates the source device is transmitting training sequences to the destination device, while the label D→S indicates the destination device is transmitting training-sequences to the source device.

The terms SIFS and MIFS indicate a short interframe space and a medium interframe space, respectively. These are scheduled delays between the time one device stops transmitting and another device starts transmitting, to give the respective devices time to switch their circuitry between transmit and receive modes. These specific delays are commonly used in wireless transmissions, but their inclusion here should not be interpreted as a requirement in various embodiments of the invention unless so claimed.

If the destination device does not respond to the RTT, or if it responds by transmitting a CTT that does not accept the request to train, then the indicated training session in FIG. 6 may be aborted without transmitting any training sequences. However, if the destination device agrees to the training by returning an appropriate CTT, then the two devices may immediately begin exchanging training sequences as shown. TRN indicates transmission of multiple training sequence containing predetermined data, which the receiving device may process in particular ways to obtain parameters for antenna directivity. In some embodiments, each TRN may include all the contents of FIG. 4, or alternatively all the contents of FIG. 5, but this specific content should not be considered a limitation on various embodiments of the invention unless so claimed. The receiving device may respond to the TRN by transmitting an ACK to indicate it correctly received the training data. The ACK may also contain other useful information, such as but not limited to an AFIE such as that illustrated in FIG. 3C. In some embodiments, an ACK is not required, if the Feedback Needed field of the ATIE from the source device so indicates. A single TRN, with its associated ACK (if the ACK is used) is referred to here as a training block. As seen in FIG. 6, two-way antenna training may be accomplished by transmitting the training sequences from the source device to the destination device, and then from the destination device to the source device.

The antenna training process may be a repetitive process, which can be repeated multiple times to improve the results. Because of this, multiple blocks may be transmitted in the same direction, with each successive block intended to improve the resulting parameters for directional communications in that direction. In the same manner, the entire two-way process may be repeated, in increments labeled in FIG. 6 as iterations. To reduce the potential length of the training session, the parameters may be checked periodically, such as at the end of each iteration, or at the end of a specified number of iterations. If the parameters are suitable, the remaining iterations may be skipped. Similarly, the parameters may be checked at the end of each block, or the end of a specified number of blocks. If the parameters are suitable, the remaining blocks in that iteration in that direction may be skipped.

As previously described, the explicit training mode may be triggered by the RTT-CTT exchange between two devices, which may result in an immediate training session. However, an implicit training mode may be triggered without resorting to the use of control frames. For example, an ATIE (see FIG. 3B) may be included in another type of frame (e.g., a beacon, though other types of frame may be used), with the Status field set to request a training session. The responding device may place an ATIE in the response (which may also be a beacon or other type of frame), with the Status field set to indicate acceptance of the request. In this manner, the request and acceptance of a training session may be embedded in existing communications that were initiated for other reasons. Similarly, the actual training sequences may be embedded in existing communications frames that were initiated for other reasons. In the implicit mode, the actual training (sequences, blocks, iterations, etc.) need not happen immediately after being agreed to, and may be incorporated into one or more subsequent scheduled communications.

The implicit mode may also be used for antenna tracking (as opposed to antenna training). For antenna tracking, parameters for directional communications have already been established, and are being used. But further checking of these parameters may be used to accommodate changes in the communications environment, such as but not limited to the movement of the communication devices or of intervening objects. The same overall process may be used for antenna tracking as for implicit antenna training. In general, the process for antenna tracking may be shorter than the process for antenna training, as fewer blocks or iterations may be necessary to fine-tune the signal.

Figure 7:
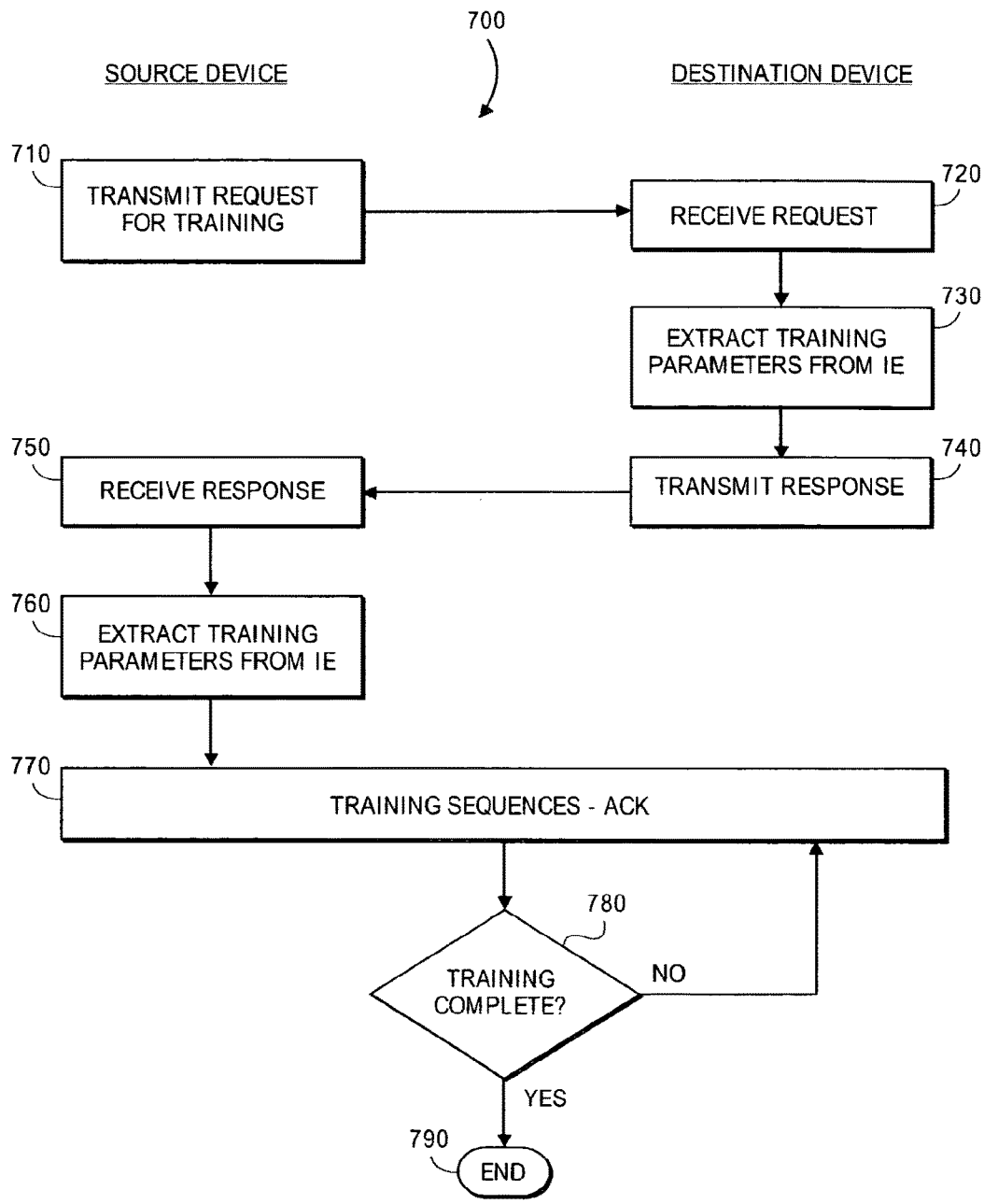
FIG. 7 shows a flow diagram of communications using a protocol for antenna training, according to an embodiment of the invention.

FIG. 7 shows a flow diagram of communications using a protocol for antenna training in a wireless network, according to an embodiment of the invention. Entries on the left side of the flow diagram indicate operations performed by the source device, while entries on the right side indicate operations performed by the destination device. In flow diagram 700, at 710 a source device may transmit a request for training to a destination device. This request may be in the form of a Request To Train control frame, or the request may be embedded in an information element in another type of frame. The destination device may receive the request at 720, and at 730 extract any necessary training parameters from an information element in the request. Note: these training parameters are used to create and interpret the training sequences used in the training process. These are different than the previously-mentioned communication parameters that are derived by performing the training process, and that will be used to shape the subsequent directional transmissions.

At 740 the destination device may transmit a response to the source device, which receives the response at 750. The response may be in the form of a Clear To Train control frame, or may be embedded in an information element in another type of frame. As before, training parameters may be extracted from an information element in the response at 760. Now that both the source and destination devices have the necessary information to perform antenna training in both directions, this bi-directional exchange of training sequences may begin at 770. If the exchange is so configured, acknowledgments may be included in the exchange, and in some embodiments the acknowledgments will contain another information element indicating the current status of the training process. In other embodiments, the acknowledgement may be omitted.

The training process may be repetitive, with the same training sequences being repeated multiple times in this training session. When the communication parameters that are derived from this process are deemed sufficient, as determined at 780, the training process may be terminated at 790, even if additional training sequences were originally planned.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A wireless device for a user station (STA) including a memory; and one or more processors configured to:
   provide a request frame for antenna training the request frame having a physical layer convergence protocol (PLOP) header that includes an indication of the presence of antenna training sequences, the request frame to initiate antenna training for operation in a 60 GHz band;
   process a response frame to the request frame, the response frame including an indication of an antenna training sequence on which a responding STA received a highest quality signal;
   determine one or more directionality setting for antenna tracking using the response frame; and
   generate a second frame for antenna tracking the second frame to include an indication of a number of training sequences requested for the antenna tracking.

2. The device of claim 1, wherein the request is separated from a preceding response by at least a short interframe space (SIFS) interval.

3. The device of claim 1, wherein the response includes an indication of a type of feedback provided with the response.

4. The device of claim 3, wherein the response includes feedback, within a feedback information element, indicating a quality of a transmission measured in the antenna training sequence.

5. The device of claim 1, wherein the request and the response repeat for a number of iterations to refine antenna beam weight values.

6. The device of claim 1, wherein the frame includes an indication of a length of an antenna training sequence.

7. The device of claim 1, further including at least one phased array antenna.

8. A non-transitory computer-readable storage medium that stores instructions for execution by one or more processors of a user station (STA) to perform operations comprising:
   provide a request frame for antenna training, the request frame having a physical layer convergence protocol (PLCP) header that includes an indication of the presence of antenna training sequences, the request frame to initiate antenna training for operation in a 60 GHz band;
   process a response frame to the request frame, the response frame including an indication of an antenna training sequence on which a responding STA received a highest quality signal, wherein the response frame includes an indication of a type of feedback provided with the response frame;
   determine one or more directionality settings for antenna tracking using the response frame; and
   generate a second frame for antenna tracking, the second frame to include an indication of a number of training sequences requested for the antenna tracking.

9. A user station (STA), comprising:
   a wireless communication device including a radio, a processor, and a memory, the wireless communication device to operate in a 60 GHz or higher frequency band to:
   provide a request frame for antenna training, the request frame having a physical layer convergence protocol (PLCP) header that includes an indication of the presence of antenna training sequences, the request frame to initiate antenna training for operation in a 60 GHz band;
   process a response frame to the request frame, the response frame including an indication of an antenna training sequence on which a responding STA received a highest quality signal and the response frame further including an indication of a type of feedback provided with the response;
   determine one or more directionality settings for antenna tracking using the response frame; and
   generate a second frame for antenna tracking the second frame to include an indication of a number of training sequences requested for the antenna tracking.

10. The apparatus of claim 9, further comprising at least two antennas.

11. The apparatus of claim 10, wherein at least one of the at least two antennas is a non-trainable antenna.

12. The apparatus of claim 9, wherein the request is separate from a preceding response by at least a short interframe space (SIFTS) interval.

13. The apparatus of claim 9, wherein the response includes feedback, within a feedback information element (IE), indicating a quality of a transmission measured in the antenna training sequence.

14. A device including a memory and one or more processors, the one or more processors including circuitry, the circuitry having logic to:
   configure the device to receive a request frame for antenna training, the request frame having a physical layer convergence protocol (PLCP) header that includes an indication of the presence of antenna training sequences, the request frame to initiate antenna training for operation in a 60 GHz band;
   provide a response frame to the request frame, for determining one or more directionality settings for antenna tracking, within a short interframe space (SIFS) of receiving the request frame, wherein the response frame includes an indication of an antenna training sequence on which a responding STA received a highest quality signal; and
   configure the device to receive a second frame for antenna tracking, the second frame to include an indication of a number of training sequences requested for the antenna tracking.

15. The device of claim 14, wherein the indication is provided within a feedback information element (IE) that indicates a quality of a transmission measured in the antenna training sequence.

* * * * *

UNITED STATES PATENT AND TRADEMARK OFFICE
CERTIFICATE OF CORRECTION

PATENT NO. : 10,135,515 B2  
APPLICATION NO. : 14/863000  
DATED : November 20, 2018  
INVENTOR(S) : Carlos Cordeiro Page 1 of 1

It is certified that error appears in the above-identified patent and that said Letters Patent is hereby corrected as shown below:

On the Title Page

On page 2, in Column 2, under "Other Publications", Line 23, delete "Ofice" and insert --Office-- therefor In the Claims In Column 9, Line 19, in Claim 1, after "training", insert --,--

In Column 9, Line 21, in Claim 1, delete "(PLOP)" and insert --(PLCP)-- therefor In Column 9, Line 29, in Claim 1, delete "setting" and insert --settings-- therefor In Column 9, Line 31, in Claim 1, after "tracking", insert --,--

In Column 9, Lines 52-53, in Claim 8, delete "comp rising:" and insert --comprising:-- therefor In Column 10, Line 26, in Claim 9, after "tracking", insert --,--

In Column 10, Line 36, in Claim 12, delete "(SIFTS)" and insert --(SIFS)-- therefor Signed and Sealed this  
Twenty-fourth Day of March, 2020

Andrei Iancu  
*Director of the United States Patent and Trademark Office*